US012177720B2

(12) United States Patent
Krishan

(10) Patent No.: US 12,177,720 B2
(45) Date of Patent: Dec. 24, 2024

(54) METHODS, SYSTEMS, AND COMPUTER READABLE MEDIA FOR NOTIFICATION DELIVERY

(71) Applicant: Oracle International Corporation, Redwood Shores, CA (US)

(72) Inventor: Rajiv Krishan, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 287 days.

(21) Appl. No.: 17/685,159

(22) Filed: Mar. 2, 2022

(65) Prior Publication Data
US 2023/0284081 A1 Sep. 7, 2023

(51) Int. Cl.
*H04W 28/02* (2009.01)
*H04W 48/08* (2009.01)
(Continued)

(52) U.S. Cl.
CPC ....... *H04W 28/0284* (2013.01); *H04W 48/08* (2013.01); *H04W 48/16* (2013.01); *H04W 68/00* (2013.01); *H04W 72/56* (2023.01)

(58) Field of Classification Search
CPC .......... H04L 27/2601; H04W 28/0268; H04W 28/10; H04W 76/10; H04W 80/02;
(Continued)

(56) References Cited

U.S. PATENT DOCUMENTS 10,616,802 B2    4/2020   Krishan et al.
11,622,293 B2 *  4/2023   Gupta ................ H04L 41/5054
                                                              370/235

(Continued)

FOREIGN PATENT DOCUMENTS

EP    3496447 B1 *  3/2024  ......... H04L 41/0893
KR    20220005936 A   1/2022
(Continued)

OTHER PUBLICATIONS

"3rd Generation Partnership Project; Technical Specification Group Core Network and Terminals; 5G System; Network Function Repository Services; Stage 3 (Release 17)," 3GPP TS 29.510, V17.4.0, pp. 1-284 (Dec. 2021).

"3rd Generation Partnership Project; Technical Specification Group Core Network and Terminals; 5G System; Technical Realization of Service Based Architecture; Stage 3 (Release 17)," 3GPP TS 29.500, V17.4.0, pp. 1-109 (Sep. 2021).

(Continued)

*Primary Examiner* — Nathan S Taylor
(74) *Attorney, Agent, or Firm* — Jenkins, Taylor & Hunt, P.A.

(57) ABSTRACT

Methods, systems, and computer readable media for notification delivery are disclosed. One example method for notification delivery comprises: at a network function including at least one processor: receiving a first message indicating that first notification data is available for a first notification receiver; determining, during an overload or congestion condition, that a computed priority value for a first notification message associated with the first message indicates an acceptable priority value for delivery during the overload or congestion condition, wherein the computed priority value is computed using a first priority value associated with the first notification message and a minimum priority value and a maximum priority value associated with the first notification receiver and/or a first service type; and sending the first notification message to the first notification receiver.

20 Claims, 7 Drawing Sheets

(51) Int. Cl.
  *H04W 48/16*     (2009.01)
  *H04W 68/00*     (2009.01)
  *H04W 72/56*     (2023.01)

(58) Field of Classification Search
  CPC ..... H04W 76/12; H04W 28/02; H04W 80/10;
       H04W 76/20; H04W 4/40; H04W 4/46;
       H04W 4/44; H04W 40/22; H04W 40/248;
       H04W 40/24; B60W 60/001; B60W
       60/00; G05D 1/02; G01S 5/14; G01S
       5/06
  See application file for complete search history.

(56)                References Cited

U.S. PATENT DOCUMENTS

| | | | | |
|---|---|---|---|---|
| 2016/0007170 | A1* | 1/2016 | Vaidya | H04W 4/12 |
| | | | | 370/312 |
| 2018/0234291 | A1* | 8/2018 | Mathison | H04W 60/06 |
| 2018/0324671 | A1* | 11/2018 | Palnati | H04L 12/1407 |
| 2019/0069235 | A1* | 2/2019 | Patil | H04W 52/0216 |
| 2021/0385283 | A1 | 12/2021 | Talebi Fard et al. | |
| 2021/0410059 | A1 | 12/2021 | Talebi Fard et al. | |
| 2022/0094740 | A1* | 3/2022 | Saride | H04L 43/0882 |
| 2022/0330085 | A1 | 10/2022 | Li | |
| 2022/0400401 | A1 | 12/2022 | Gupta et al. | |
| 2023/0146433 | A1* | 5/2023 | Sharma | H04L 47/745 |
| | | | | 709/226 |
| 2024/0121199 | A1* | 4/2024 | Krishan | H04L 47/2458 |

FOREIGN PATENT DOCUMENTS

| | | | |
|---|---|---|---|
| WO | WO 2018/141945 A1 | | 8/2018 |
| WO | WO-2020109853 A1 | * | 6/2020 |
| WO | WO 2022/265853 A1 | | 12/2022 |

OTHER PUBLICATIONS

"3rd Generation Partnership Project; Technical Specification Group Services and System Aspects; Architecture enhancements to facilitate communications with packet data networks and applications (Release 16)," 3GPP TS 23.684, V16.10.0, pp. 1-135 (Sep. 2021).
"3rd Generation Partnership Project; Technical Specification Group Core Network and Terminals; 5G System; Network Exposure Function Northbound APIs; Stage 3 (Release 16)," 3GPP TS 29.522, V16.9.0, pp. 1-185 (Sep. 2021).
"3rd Generation Partnership Project; Technical Specification Group Core Network and Terminals; T8 reference point for Northbound APIs; (Release 16)," 3GPP TS 29.122, V16.11.0, pp. 1-408 (Sep. 2021).
Corrected Notice of Allowability of U.S. Appl. No. 17/348,389 (Jan. 19, 2023).
Notice of Allowance and Fee(s) Due for U.S. Appl. No. 17/348,389 (Nov. 18, 2022).
Notification of Transmittal of the International Search Report and the Written Opinion of the International Searching Authority, or the Declaration for International Application No. PCT/US2022/031572 (Sep. 8, 2022).
"Ultra Cloud Core 5G Session Management Function, Release Jan. 2021—Configuration and Administration Guide," Cisco, pp. 1-13 (May 13, 2021).
"3rd Generation Partnership Project; Technical Specification Group Core Network and Terminals; 5G System; Technical Realization of Service Based Architecture; Stage 3 (Release 16)," 3GPP TS 29.500, V16.7.0), pp. 1-91, (Mar. 2021).
"3rd Generation Partnership Project; Technical Specification Group Services and System Aspects; System Architecture for the 5G System (5GS); Stage 2 (Release 17)," 3GPP TS 23.501, V17.0.0, pp. 1-489 (Mar. 2021).
"3rd Generation Partnership Project; Technical Specification Group Services and System Aspects; Procedures for the 5G System (5GS); Stage 2 (Release 17)," 3GPP TS 23.502, V17.0.0, pp. 1-646 (Mar. 2021).
"3rd Generation Partnership Project; Technical Specification Group Core Network and Terminals; Network Slice Selection Services; Stage 3 (Release 17)," 3GPP TS 29.531, V17.0.0, pp. 1-77 (Mar. 2021).
"3rd Generation Partnership Project; Technical Specification Group Services and System Aspects; Telecommunication management; Study on management and orchestration of network slicing for Next Generation Network; (Release 15)," 3GPP TS 28.801, V15.1.0, pp. 1-75 (Jan. 2018).
"3rd Generation Partnership Project; Technical Specification Group Services and System Aspects; Management and Orchestration; Provisioning; (Release 16)," 3GPP TS 28.531, V16.9.0, pp. 1-73 (Mar. 2021).
"3rd Generation Partnership Project; Technical Specification Group Core Network and Terminals; 5G System; Network Function Repository Services; Stage 3 (Release 17)," 3GPP TS 29.510 V17.6.0, pp. 1-306 (Jun. 2022).
"3rd Generation Partnership Project; Technical Specification Group Core Network and Terminals; 5G System Session Management Policy Control Service; Stage 3; (Release 17)," 3GPP TS 29.512 V17.7.0, pp. 1-255 (Jun. 2022).
Commonly-Assigned, Co-pending U.S. Appl. No. 17/348,389 for "Methods, Systems, and Computer Readable Media for Establishing Message Priority in Network Slices Based on Quality of SE," (Unpublished, filed Jun. 16, 2021).
Commonly-Assigned, Co-pending U.S. Appl. No. 17/960,800 for "Methods, Systems, and Computer Readable Media for Adjusting and Using Priorities of Service/Notification Request Messages at Network Functions with Multiple Slice Support," (Unpublished, filed Oct. 5, 2022).
Notice of Allowance and Fee(s) Due for U.S. Appl. No. 16/121,203 (Nov. 18, 2019).
"3rd Generation Partnership Project; Technical Specification Group Services and System Aspects; Architecture enhancements to facilitate communications with packet data networks and applications (Release 15)," 3GPP TS 23.682, V15.5.0, pp. 1-125 (Jun. 2018).

* cited by examiner

300

| RECEIVER ID | SERVICE | CA POLICY | MIN | MAX | DEFAULT | DESCRIPTION |
|---|---|---|---|---|---|---|
| SCS1 | NIDD | A | 0 | 255 | 50 | POLICY DATA FOR A NIDD NOTIFICATION TOWARD SCS1 |
| SCS1 | MONTE | A | 50 | 100 | 75 | POLICY DATA FOR A MONITORING NOTIFICATION TOWARD SCS1 |
| SCS2 | NIDD | A | 10 | 60 | 15 | POLICY DATA FOR A NIDD NOTIFICATION TOWARD SCS2 |
| * | NIDD | A | 100 | 255 | 110 | POLICY DATA FOR A NIDD NOTIFICATION TOWARD AN SCS INSTANCE (WHICH IS NOT EXPLICITLY DEFINED) |
| * | * | A | 50 | 255 | 60 | POLICY DATA FOR A NOTIFICATION (E.G., A NON-NIDD NOTIFICATION) TOWARD AN SCS INSTANCE (WHICH IS NOT EXPLICITLY DEFINED) |

FIG. 3A

| CONTEXT ID | INITIAL PRIORITY (IP) | MAX IP (MIP) | MIN VALUE (MN) | MAX VALUE (MX) | PRIORITY FORMULA | COMPUTED PRIORITY (CP) |
|---|---|---|---|---|---|---|
| 1 | 0 | 255 | 40 | 100 | FLOOR(IP/MIP * (MX-MN))+MN = CP | 40 |
| 2 | 50 | 255 | 40 | 100 | FLOOR(IP/MIP * (MX-MN))+MN = CP | 51 |
| 3 | 100 | 255 | 40 | 100 | FLOOR(IP/MIP * (MX-MN))+MN =CP | 63 |
| 4 | 255 | 255 | 40 | 100 | FLOOR(IP/MIP * (MX-MN))+MN = CP | 100 |
| 5 | 60 | 100 | 50 | 75 | FLOOR(IP/MIP * (MX-MN))+MN = CP | 65 |

METHODS, SYSTEMS, AND COMPUTER READABLE MEDIA FOR NOTIFICATION DELIVERY

TECHNICAL FIELD

The subject matter described herein relates to improving communications in fourth generation (4G) and subsequent generation communications networks. More particularly, the subject matter described herein relates to methods, systems, and computer readable media for notification delivery.

BACKGROUND

In telecommunications networks, a service endpoint is an address on a network node that uniquely identifies an entity that provides service to consumers. The service endpoint can include an Internet protocol (IP) address or a combination of IP address and transport layer port number, which is also referred to as an IP endpoint.

In fifth generation (5G) telecommunications networks, the network node that provides service is referred to as a producer network function (NF). A network node that consumes services is referred to as a consumer NF. An NF can be both a producer NF and a consumer NF depending on whether it is consuming or providing service.

A given producer NF may have many service endpoints. Producer NFs register with an NF repository function (NRF). The NRF maintains NF profiles (e.g., data types or data structures for storing information about NF instances) of available NF instances and their supported services. Consumer NFs can subscribe to receive information about producer NF instances that have registered with the NRF. Once registered, NF instances in the 5G network may establish sessions with one or more network exposure functions (NEFs). Notably, the NEF is a 3GPP network function that provides a means to securely expose the services and capabilities provided by producer network functions servicing the network.

In Internet of things (IoT) deployments, there can be millions or billions of IoT devices that send data towards an application function (AF), a service capability server (SCS), or an application server (AS), e.g., via an NEF in a 5G network or a service capability exposure function (SCEF) in a fourth generation (4G) network. For example, IoT devices, such as sensors, can initiate a data transfer (e.g., an mobile originated (MO) data request) based on a particular time or event. When multiple IoT devices transmit at the same time or in response to the same event, a traffic storm at a notification receiver (e.g., an AF, an SCS, or an AS) can occur. Similar behavior may occur, when network generated notifications for monitoring contexts created by an application function (AF), a service capability server (SCS), or an application server (AS) via an NEF in a 5G network or a service capability exposure function (SCEF) in a fourth generation (4G) network. A traffic storm at a notification receiver can lead to temporary unavailability of the notification receiver. In another example, a traffic storm can overwhelm the resources of an application programming interface (API) node of an NEF or an SCEF that sends notification messages to a notification receiver. If the API interface to a notification receiver becomes overwhelmed with traffic, the service(s) provided by the notification receiver may likewise become unavailable.

SUMMARY

Methods, systems, and computer readable media for notification delivery are disclosed. One example method for notification delivery comprises: at a network function including at least one processor: receiving a first message indicating that first notification data is available for a first notification receiver; determining, during an overload or congestion condition, that a computed priority value for a first notification message associated with the first message indicates an acceptable priority value for delivery during the overload or congestion condition, wherein the computed priority value is computed using a first priority value associated with the first notification message and a minimum priority value and a maximum priority value associated with the first notification receiver and/or a first service type; and sending the first notification message to the first notification receiver.

One example system for notification delivery includes at least one processor, a memory, and a network function including the at least one processor and the memory. The network function is configured for: receiving a first message indicating that first notification data is available for a first notification receiver; determining, during an overload or congestion condition, that a computed priority value for a first notification message associated with the first message indicates an acceptable priority value for delivery during the overload or congestion condition, wherein the computed priority value is computed using a first priority value associated with the first notification message and a minimum priority value and a maximum priority value associated with the first notification receiver and/or a first service type; and sending the first notification message to the first notification receiver.

One example non-transitory computer readable medium comprising computer executable instructions embodied in the non-transitory computer readable medium that when executed by at least one processor of at least one computer cause the at least one computer to perform steps comprising: at a network function including at least one processor: receiving a first message indicating that first notification data is available for a first notification receiver; determining, during an overload or congestion condition, that a computed priority value for a first notification message associated with the first message indicates an acceptable priority value for delivery during the overload or congestion condition, wherein the computed priority value is computed using a first priority value associated with the first notification message and a minimum priority value and a maximum priority value associated with the first notification receiver and/or a first service type; and sending the first notification message to the first notification receiver.

The subject matter described herein may be implemented in hardware, software, firmware, or any combination thereof. As such, the terms "function" "node" or "module" as used herein refer to hardware, which may also include software and/or firmware components, for implementing the feature being described. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIGS. 3A-3B depict example priority related information associated with congestion avoidance or related actions;

DETAILED DESCRIPTION

Figure 1:
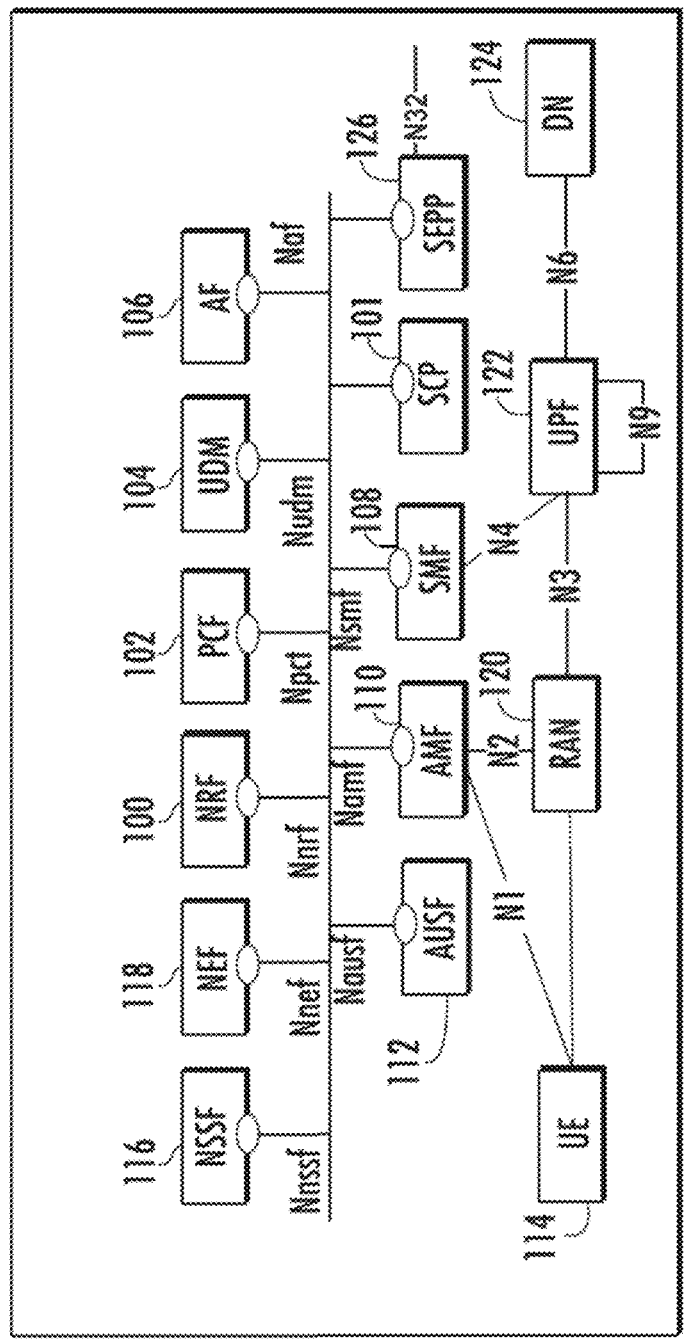
FIG. 1 is a network diagram illustrating an example fifth generation (5G) network architecture.

The subject matter described herein relates to methods, systems, and computer readable media for notification delivery. A network exposure function (NEF) or a service capability exposure function (SCEF) that is responsible for facilitating communications of mobile originated (MO) data or monitoring data (e.g., from or about Internet of things (IoT) devices or other user equipment (UE)) to various notification receivers (e.g., an application function (AF), a service capability server (SCS), or an application server (AS)) may become congested or overloaded, e.g., due to large amount of messages from network/UE devices. Similarly, notification receivers may become congested or overloaded, e.g., due to bursts of traffic (e.g., MO data notification messages) from an SCEF or an NEF. Similarly, an SCEF or an NEF may become congested or overloaded, e.g., due to bursts of traffic (e.g., MO data service requests) from the network.

An SCEF or an NEF may utilize congestion avoidance (CA) logic or rules to mitigate traffic congestion or related scenarios. As part of a CA policy, an SCEF or an NEF may be configured to discard some sets or types of messages. For example, a CA discard policy may be based on operator configured rules that utilize priority values (e.g., Diameter routing message priority (DRMP) values for Diameter messages or 3gpp-Sbi-Message-Priority values for service based interface (SBI) messages), message types, congestion levels, and/or other information. However, DRMP and 3gpp-Sbi-Message-Priority are optional message elements and, therefore, may not be present in every message. Further, some network elements may not set such priority values correctly for different message flows. Hence, a CA discard policy based on such priority information can accidentally discard important traffic, while delivering less important traffic during a congestion or overload condition. As such, conventional CA discard policies may be unable to guarantee service level agreements (SLAs) and/or may cause loss of business critical data to application providers.

In accordance with some aspects of the subject matter described herein, methods, systems, mechanisms, and/or techniques are provided for allowing notification receivers (e.g., an SCS, an AS, or an AF) to define relative priority values (also referred to herein as context priority values) for various non-IP data delivery (NIDD) contexts and to provide these relative priority values to an SCEF or an NEF for use in computing absolute or final priority values for notification messages (e.g., MO data notification messages or monitoring events (MONTE) notification messages). For example, an SCEF or an NEF may use a priority formula that takes a received context priority value associated with a relevant context and a minimum priority value and a maximum priority value specified by a network operator as inputs and outputs an absolute priority value for an MO data notification message, where the absolute priority value is usable to determine whether the message is deliverable during a congestion or overload condition.

In accordance with some aspects of the subject matter described herein, methods, systems, mechanisms, and/or techniques for notification delivery are provided. For example, during a congestion or overload condition, an NF (e.g., an SCEF or an NEF) in accordance with various aspects described herein may be configured for: determining, using computed priority values, whether messages (e.g., MO data notification messages or MONTE notification messages) should be delivered (or discarded). In this example, NF 200 or DM 204 may compute a priority value for a notification message using a context priority value provided by a related notification receiver (e.g., SCS/AS 498 or AF 106). Continuing with this example, since notification receivers can provide context priority values and since context priority values can be used to generate absolute or final priority values usable to determine whether messages are delivered (or discarded), notification receivers can affect the probability of notification rejections or successes for different NIDD contexts.

Reference will now be made in detail to various embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G system network architecture, e.g., a home 5G core (5GC) network. The architecture in FIG. 1 includes a network function (NF) repository function (NRF) 100 and a service communication proxy (SCP) 101, which may be located in the same home public land mobile network (PLMN). As described above, NRF 100 may maintain profiles of available producer NF service instances and their supported services and allow consumer NFs or SCPs to subscribe to and be notified of the registration of new/updated producer NF service instances. SCP 101 may also support service discovery and selection of producer NF instances. SCP 101 may perform load balancing of connections between consumer and producer NFs. In addition, using the methodologies described herein, SCP 101 may perform preferred NF location based selection and routing.

NRF 100 is a repository for NF or service profiles of producer NF instances. In order to communicate with a producer NF instance, a consumer NF or an SCP must obtain the NF or service profile or the producer NF instance from NRF 100. The NF or service profile is a JavaScript object notation (JSON) data structure defined in 3GPP TS 29.510. The NF or service profile definition includes at least one of a fully qualified domain name (FQDN), an IP version 4 (IPv4) address, or an IP version 6 (IPv6) address. In FIG. 1, any of the nodes (other than NRF 100) can be either consumer NFs or producer NFs, depending on whether they are requesting or providing services. In the illustrated example, the nodes include a policy control function (PCF) 102 that performs policy related operations in a network, a user data management (UDM) function 104 that manages user data, and an application function (AF) 106 that provides application services. The nodes illustrated in FIG. 1 further include a session management function (SMF) 108 that manages sessions between access and mobility management function (AMF) 110 and PCF 102. AMF 110 performs mobility management operations similar to those performed by a mobility management entity (MME) in 4G networks. An authentication server function (AUSF) 112 performs authentication services for user devices, such as user equipment (UE) 114, seeking access to the network.

A network slice selection function (NSSF) 116 provides network slicing services for devices seeking to access specific network capabilities and characteristics associated with a network slice. A network exposure function (NEF) 118 provides application programming interfaces (APIs) for application functions seeking to obtain information about Internet of things (IoT) devices and other UEs attached to the network. NEF 118 performs similar functions to the service capability exposure function (SCEF) in 4G networks.

A radio access network (RAN) 120 connects UE 114 to the network via a wireless link. Radio access network 120 may be accessed using a g-Node B (gNB) (not shown in FIG. 1) or other wireless access point. A user plane function (UPF) 122 can support various proxy functionality for user plane services. One example of such proxy functionality is multipath transmission control protocol (MPTCP) proxy functionality. UPF 122 may also support performance measurement functionality, which may be used by UE 114 to obtain network performance measurements. Also illustrated in FIG. 1 is a data network (DN) 124 through which UEs access data network services, such as Internet services.

Security edge protection proxy (SEPP) 126 filters incoming traffic from another PLMN and performs topology hiding for traffic exiting the home PLMN. SEPP 126 may communicate with a SEPP in a foreign PLMN which manages security for the foreign PLMN. Thus, traffic between NFs in different PLMNs may traverse two SEPP functions, one for the home PLMN and the other for the foreign PLMN.

SEPP 126 may utilize an N32-c interface and an N32-f interface. An N32-c interface is a control plane interface between two SEPPs usable for performing an initial handshake (e.g., a TLS handshake) and negotiating various parameters for an N32-f interface connection and related message forwarding. An N32-f interface is a forwarding interface between two SEPPs 126 usable forwarding various communications (e.g., 5GC requests) between a consumer NF and a producer NF after applying application level security protection.

It will be appreciated that FIG. 1 is for illustrative purposes and that various nodes and/or modules, locations, and/or functionality described above in relation to FIG. 1 may be changed, altered, added, or removed.

Figure 2:
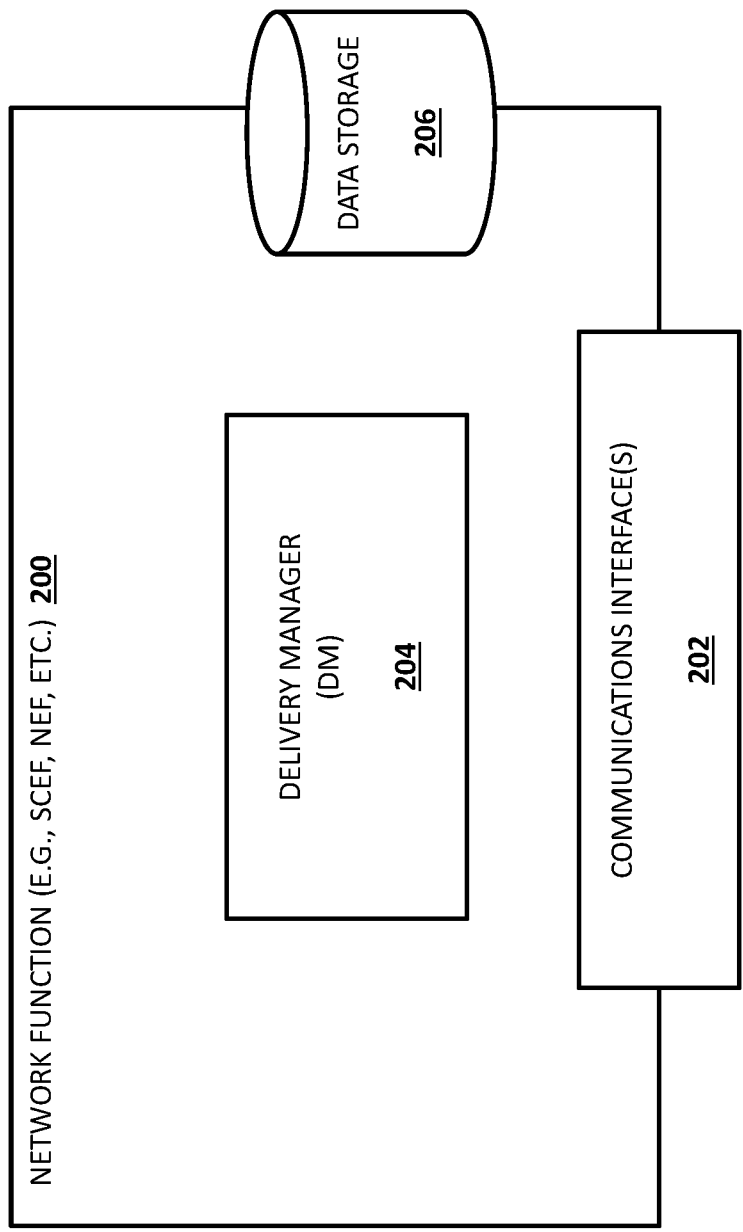
FIG. 2 is a block diagram illustrating an example network function (NF) for notification delivery.

FIG. 2 is a diagram illustrating an example NF 200 for notification delivery. NF 200 may represent any suitable entity or entities (e.g., one or more node(s), device(s), or computing platform(s)) for performing various aspects or functionalities described herein, e.g., sending various notifications (e.g., MO data notification message(s) or MONTE notification message(s)) to a notification receiver, e.g., an AF, an AS, or an SCS. In some embodiments, NF 200 may include one or more 3GPP defined functions (e.g., NEF 118 or an SCEF) and/or related functionality. In some embodiments, NF 200 may include an authorization server, a data repository, a network gateway, a machine type communication inter-working function (MTC-IWF), a network proxy, an edge security device, and/or other functionality.

In some embodiments, NF 200 may include NEF 118 or similar functionality. For example, NF 200 may include or access logic and related information for securely exposing the services and capabilities provided by producer NFs servicing the network. In this example, NF 200 may provide APIs for AFs 106 seeking to obtain information (e.g., MO data or monitoring data) about IoT devices and other UEs attached to the network. Continuing with this example, NF 200 may also authenticate and/or authorize AFs 106 to use one or more of the APIs and may also log and charge for usage by AFs 106.

In some embodiments, NF 200 may include an SCEF or similar functionality. For example, NF 200 may include or access logic and related information for securely exposing the services and capabilities provided by producer NFs servicing the network. In this example, NF 200 may provide APIs for SCSs (or ASs) seeking to obtain information (e.g., MO data or monitoring data) about IoT devices and other UEs attached to the network. Continuing with this example, NF 200 may also authenticate and/or authorize SCSs (or ASs) to use one or more of the APIs and may also log and charge for usage by SCSs (or ASs).

Referring to FIG. 2, NF 200 may include one or more communications interface(s) 202 for communicating messages via a communications environment, e.g., one or more communications networks. For example, communications interface(s) 202 may include one or more communications interfaces for communicating with various entities in a home network (e.g., home public land mobile network (H-PLMN)) or a visited network (e.g., a visited public land mobile network (V-PLMN)).

NF 200 may include a delivery manager (DM) 204. DM 204 may be any suitable entity (e.g., software executing on at least one processor) for performing various operations associated with delivering messages, e.g., MO data notification messages to notification receivers. For example, DM 204 may be configured for receiving a message (e.g., an MO delivery request) indicating that MO data is available for a notification receiver; determining, during an overload or congestion condition (e.g., an event or state), that a computed priority value for an MO data notification message associated with the message is sufficient for delivery during the overload or congestion condition; and sending the MO data notification message to the notification receiver.

In some embodiments, NF 200, DM 204, or another entity may utilize network operator defined information for various notification receivers (e.g., an SCS, AS, or AF) and T8 or N33 service types (e.g., NIDD, MONTE, etc.). For example, for a given SCS/AS instance and a T8 service type, a network operator may provision or specify a minimum priority value, a maximum priority value, and a default priority value. In this example, at least some of this provided information may be used (e.g., by NF 200 or DM 204) to compute an absolute or final priority value for a message (e.g., an MO data notification message).

In some embodiments, a lower priority value may indicate a higher relative importance of a corresponding message. For example, an MO data notification message with a priority value of '0' or '1' may be more important than an MO data notification message with a priority value of '50'. In this example, when comparing a priority value to a threshold value, NF 200 or DM 204 may determine whether a message's priority value is less than or equal to a threshold value and, if so, NF 200 or DM 204 may determine that the message should be delivered (e.g., during a congestion or overload condition).

In some embodiments, a lower priority value may indicate a lower relative importance of a corresponding message. For example, an MO data notification message with a priority value of '0' or '1' may be less important than an MO data notification message with a priority value of '50'. In this example, when comparing a priority value to a threshold value, NF 200 or DM 204 may determine whether a message's priority value is greater than or equal to a threshold value and, if so, NF 200 or DM 204 may determine that the message should be delivered (e.g., during a congestion or overload condition).

In some embodiments, NF 200, DM 204, or another entity may receive, store, and/or utilize context priority values (also referred to herein as an initial or relative priority value) and/or other context information from notification receivers (e.g., SCSs, ASs, or AFs). For example, a notification receiver (e.g., a SCS/AS or AF 106) may provide a context priority value (e.g., a value between a user-configurable range, such as 0-255) in an NIDD configuration message sent to NF 200 (e.g., an SCEF or NEF 118). In this example, NF 200, DM 204, or another entity may store the context priority value and other context information in data storage 206 (e.g., in a context data store or other data store).

In some embodiments, priority related information may be provided to NF 200, DM 204, or another entity in a custom header portion or in one or more data elements or information elements (IEs). For example, priority related information may be stored in a vendor-specific data structure or a related element. An example of vendor-specific data indicating priority related information is shown below.

```
"vendorSpecific-000111": {
  "version": 1,
  "context_priority": <priority value>
}
```

In some embodiments, e.g., as depicted in the example above, priority related information may include a version attribute and/or a context priority attribute indicating a context priority value (e.g., an initial priority value that can be used as input in a formula for computing an absolute priority value).

In some embodiments, e.g., during a congestion or overload condition (e.g., an event or state), NF 200 (e.g., an SCEF or NEF 118) or DM 204 may receive a message (e.g., an MO data request or an MO data delivery request) for triggering an MO data notification message associated with a given NIDD context (e.g., associated with a particular notification receiver and/or T8 service). In such embodiments, NF 200 or DM 204 may use a context priority value associated with the NIDD context to calculate or compute an absolute priority value, e.g., NF 200 or DM 204 may use a formula or algorithm that takes as input the context priority value and a minimum priority value and a maximum priority value (e.g., provided by a network operator) associated with the notification receiver and/or T8 service associated with the MO data notification message and outputs an absolute or final priority value.

In some embodiments, e.g., during a congestion or overload condition, if a context priority value is not provided or set for a given context (e.g., by a notification receiver), NF 200 (e.g., an SCEF or NEF 118) or DM 204 may use a default priority value (e.g., provided or specified by a network operator) as an absolute priority value.

In some embodiments, NF 200 (e.g., an SCEF or NEF 118) or DM 204 may use a computed absolute priority value to determine how to handle a message (e.g., an MO data notification message or a MONTE notification message). For example, NF 200 (e.g., an SCEF or NEF 118) or DM 204 may allow or reject delivery of an MO data notification message based on a CA policy or other rules. In this example, NF 200 or DM 204 may compare a message's computed priority value to an appropriate threshold value (e.g., based on the congestion or overload level of NF 200 or other factors) and, if the computed priority value is sufficient, may allow the MO data notification message to be sent toward appropriate notification receiver (e.g., a SCS/AS or AF 106).

NF 200 and/or DM 204 may access (e.g., read from and/or write information to) data storage 206. Data storage 206 may be any suitable entity (e.g., a computer readable medium or memory) for storing priority related information, CA policies, and/or message handling logic. In some embodiments, data storage 206 may include a context data store for storing session or context information and/or other data, e.g., various settings or information usable for computing absolute priority values. In some embodiments, data storage 206 may include logic for performing various aspects associated with SCS functions, AS function, or AF functions. In some embodiments, data storage 206 may include logic for implementing or enforcing one or more CA policies. For example, data storage 206 may include one or more threshold values for one or more congestion levels and/or NIDD contexts. In this example, when NF 200 is experiencing congestion or is overloaded, NF 200 or DM 204 may determine that an MO data notification message has an absolute priority value that meets or exceeds a threshold value for delivery.

It will be appreciated that FIG. 2 and its related description are for illustrative purposes and that NF 200 may include additional and/or different modules, components, or functionality.

FIGS. 3A-3B depict example priority related information 300-302 associated with CA or related actions. For example, priority related information 300-302 may be stored and accessible by NF 200 and/or DM 204 for implementing one or more CA policies. In this example, NF 200 or DM 204 may compute priority values based on an NIDD context or other information (e.g., a receiver identifier and/or a service type) and then compare the computed priority values to relevant threshold values to determine whether a related message is to be delivered (e.g., sent onward) to a notification receiver.

Referring to FIG. 3A, information 300 may include or represent CA policies or related rule data usable by NF 200 and/or DM 204 and is depicted in a tabular format comprising columns and/or fields for receiver identifiers (IDs), T8 services, CA policies, minimum priority values, maximum priority value, default priority values, and descriptions. Each row may represent various policy related data associated with a particular notification receiver and/or a T8 service. For example, when a congestion condition exists, NF 200 or DM 204 may identify a rule for determining whether an MO data notification message should be delivered. In this example, the rule may be selected based on the notification receiver and/or service type associated with the MO data notification message.

In some embodiments, information 300 may include policy data provided by a network operator (e.g., at initialization and/or during run-time). For example, a network operator may set or configure CA policy rules based on a particular notification receiver and/or a service type. In this example, each rule may indicate settings that can affect computed priority values, e.g., a minimum priority value, a maximum priority value, and a default priority value (e.g., usable when a context priority value is not provided by a relevant notification receiver).

A "receiver ID" field may store information for indicating or identifying a particular notification receiver, e.g., an AS, an SCS, or an AF. Example data in the "context ID" field may include a unique identifier (e.g., an scsAsID or other identifier) for identifying or indicating a particular notification receiver or instance thereof, e.g., 'SCS1', 'AF1', 'SCS2', 'AF2', etc. In some embodiments, e.g., where a rule is relevant for a non-specific receiver or multiple receivers (e.g., any SCS instances or any AF instances), a 'wildcard' identifier may be used for representing or indicating any or all notification receivers, e.g., '*'.

A "service" field may store information for indicating or identifying a T8 or an N33 service associated with a particular policy rule or related data. Example data in the "service" field may include a value or identifier for indicating a non-IP data delivery (NIDD) service or a MONTE service. In some embodiments, e.g., where a rule is relevant for a non-specific service type or multiple service types (e.g., all T8/N33 service types), a 'wildcard' identifier may be used for representing or indicating any or all service types, e.g., '*'.

A "CA policy" field may store information for indicating or identifying a particular CA policy associated with a particular receiver and/or T8 service. In some embodiments, a CA policy may indicate various settings, e.g., threshold values for different congestion levels, minimum priority values, maximum priority values, default priority values. Example data in the "CA policy" field may be 255 (e.g., based on 1-byte attribute size) or another value (e.g., 100).

In some embodiments, a CA policy may be system-wide (e.g., used for all MO data delivery scenarios) or may be context-specific, receiver-specific, or based on one or more factors, e.g., operator settings, congestion levels, CA policy, service types, notification receiver, etc.

A "min" field may store information for indicating or identifying a minimum allowed priority value associated with a particular rule or related data, e.g., provided by a network operator or other entity, e.g., at initialization or during run-time. For example, a minimum priority value may have a corresponding maximum priority value, where the minimum priority value is less than or equal to its corresponding maximum priority value. Example data in the "min" field may include a value such as 0, 10, 50, 100, etc.

A "max" field may store information for indicating or identifying a minimum allowed priority value associated with a particular rule or related data, e.g., provided by a network operator or other entity, e.g., at initialization or during run-time. For example, a maximum priority value may have a corresponding minimum priority value, where the maximum priority value is greater than or equal to its corresponding minimum priority value. Example data in the "max value" field may include a value such as 60, 100, 255, etc.

A "default" field may store information for indicating or identifying a default priority value associated with a particular rule or related data. For example, if an initial priority value is not provided by a notification receiver, a default priority value may be usable as an initial priority value that get transformed into an absolute or final priority value by a priority formula or algorithm. In another example, if an initial priority value is not provided by a notification receiver, a default priority value may be usable as an absolute or final priority value, e.g., in lieu of using a priority formula or algorithm. Example data in the "default" field may include a value such as 15, 50, 60, 75, 110, etc.

A "description" field may store information for describing a particular rule or related data. For example, a description may indicate that a specific rule is appropriate for messages associated with a particular notification receiver and a particular service type. In another example, a description may indicate that a specific rule is appropriate for messages associated with a particular notification receiver and any service type. In another example, a description may indicate that a specific rule is appropriate for messages associated with any notification receiver and a particular service type. In another example, a description may indicate that a specific rule is appropriate for all other messages, e.g., messages associated with any notification receiver and any service type.

In some embodiments, NF 200 or DM 204 may apply rules or policy data based on an order of selection or related logic. For example, NF 200 or DM 204 may attempt to identify a granular rule that matches both a notification receiver (e.g., an ScsAsId) and a T8 service associated with a pending (e.g., yet to be delivered) MO data notification message. In this example, if no such rule exists, then NF 200 or DM 204 may attempt to identify a less granular rule that matches the T8 service associated with the pending MO data notification message. Continuing with this example, if no such rule exists, then NF 200 or DM 204 may attempt to identify a least granular rule (e.g., a base rule) that accepts any notification receiver and any T8 service as a match.

Referring to FIG. 3B, information 302 may include data usable for computing a priority value and is depicted in a tabular format comprising columns and/or fields for initial priority values, maximum allowed initial priority values, minimum priority values, maximum priority values, priority formulas, and computed priority values. Each row may represent various data usable for computing a priority value for a particular message, a message flow, or an NIDD context.

In some embodiments, information 302 may include data provided by a network operator (e.g., at initialization and/or during run-time), data provided by a notification receiver (e.g., at or during an NIDD configuration procedure), and/or data provided by other entities.

A "context ID" field may store information for indicating or identifying priority related information associated with particular NIDD context (e.g., a notification receiver and/or a related service). Example data in the "context ID" field may include a unique identifier (e.g., a single key or a combined key) for identifying or indicating a context associated with a notification receiver.

An "initial priority" field may store information for indicating or identifying a priority value associated with a particular NIDD context, e.g., provided by a notification receiver during a NIDD configuration procedure. Example data in the "initial priority" field may include a value that is between 0 and the maximum allowed initial priority value (e.g., the maximum allowed priority value may be based on the byte size of a "context_priority" attribute in an NIDD configuration message).

A "max IP" field may store information for indicating or identifying a maximum allowed initial priority value. In some embodiments, a maximum allowed initial priority value may be based on the byte size of a "context_priority" attribute or data element. Example data in the "max IP" field may be 255 (e.g., based on 1-byte attribute size) or another value (e.g., 100).

A "min value" field may store information for indicating or identifying a minimum allowed priority value associated with a particular NIDD context, e.g., provided by a network operator or other entity, e.g., at initialization or during run-time. For example, a minimum priority value may have a corresponding maximum priority value, where the minimum priority value is less than or equal to its corresponding maximum priority value. Example data in the "min value" field may include a value such as 0, 40, 50, etc.

A "max value" field may store information for indicating or identifying a minimum allowed priority value associated with a particular NIDD context, e.g., provided by a network operator or other entity, e.g., at initialization or during run-time. For example, a maximum priority value may have a corresponding minimum priority value, where the maximum priority value is greater than or equal to its corresponding minimum priority value. Example data in the "max value" field may include a value such as 50, 75, 100, etc.

A "priority formula" field may store information for indicating or identifying a formula or algorithm for computing a priority value (e.g., an absolute priority value) associated with a particular NIDD context. For example, a formula or algorithm indicated in a corresponding "priority formula" field may be used to compute a priority value for a message associated with a NIDD context. In this example, the formula or algorithm may use values (e.g., an initial priority value, a max IP value, a minimum priority value, and a maximum priority value) from corresponding fields associated with a given NIDD context. Example data in the "priority formula" field may include a value such as 40, 51, 63, 100, 65, etc.

In some embodiments, a priority formula may be system-wide (e.g., used for computing priority values for all contexts) or may be context-specific, receiver-specific, or based on one or more factors, e.g., operator settings, congestion levels, CA policy, service types, notification receiver, etc.

A "computed priority" field may store information for indicating or identifying a computed priority value associated with a particular NIDD context. For example, a computed priority value may be computed using a formula or algorithm indicated in a corresponding "priority formula" field. In this example, the computed priority value may be computed or recomputed at various times, e.g., at NIDD configuration and/or when MO data is available for delivery. Example data in the "computed priority" field may include a value such as 40, 51, 63, 100, 65, etc.

In some embodiments, e.g., when a priority rule or related data changes, NF 200 or DM 204 may store data (e.g., 'recompute' flags) and/or use various logic to indicate when to recompute a priority value.

It will be appreciated that priority related information 300-302 is for illustrative purposes and that different and/or additional data than the data depicted in FIGS. 3A-3B may be usable for managing or controlling MO data delivery or related operations, e.g., implementing one or more CA policies using computed priority values (e.g., absolute priority values computed using context related information).

Figure 4:
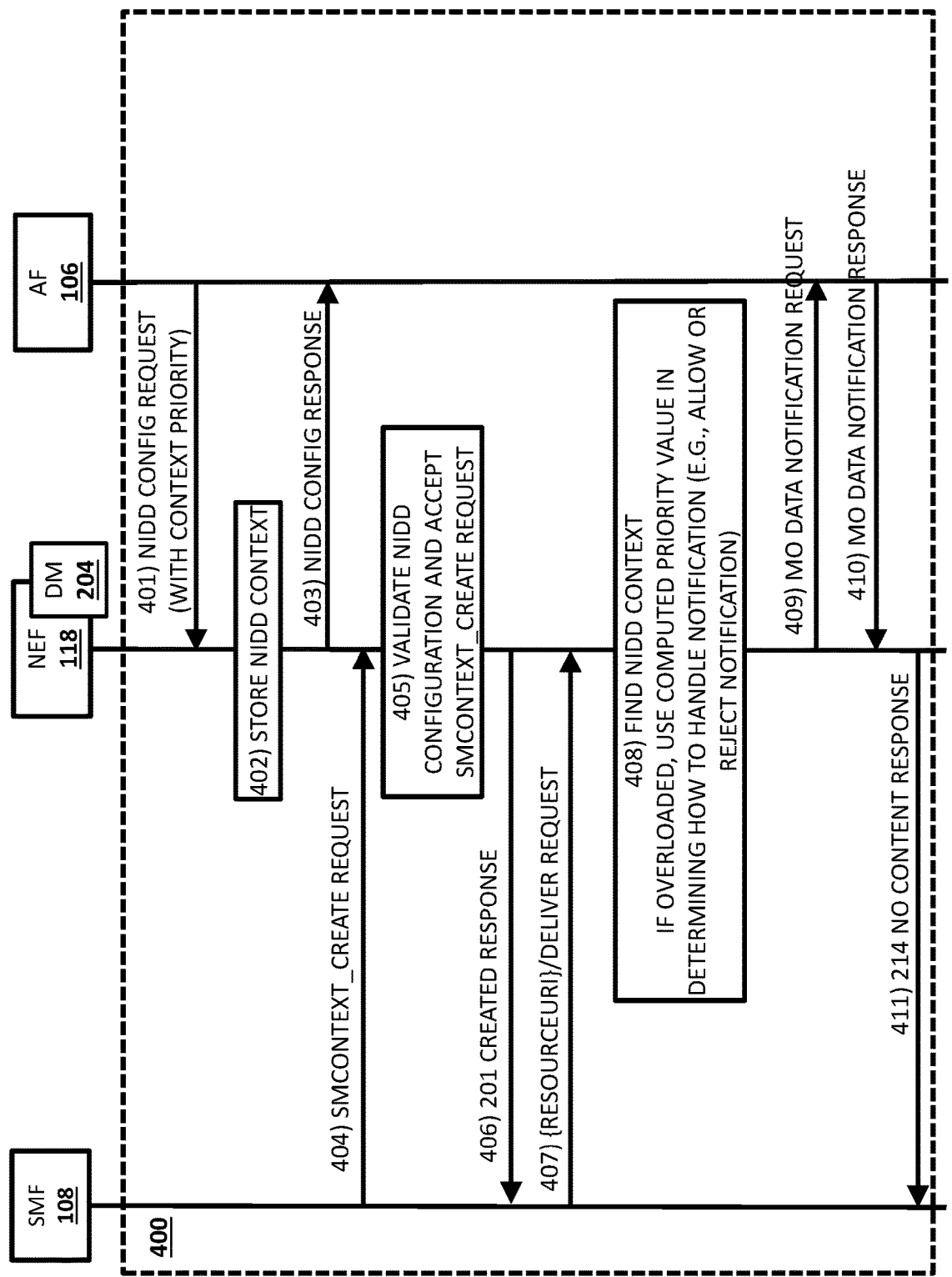
FIG. 4 is a message flow diagram illustrating an example scenario involving MO data delivery using a network exposure function (NEF)

FIG. 4 is a message flow diagram illustrating an example scenario 400 involving MO data delivery using NEF 118. In some embodiments, NEF 118 may include DM 204 and/or various functionality similar to or the same as NF 200. For example, NEF 118 or DM 204 may be configured to control or manage messages associated with MO data delivery, e.g., by implementing or enforcing one or more CA policies. In this example, e.g., during an overload or congestion condition, NEF 118 or DM 204 may use a computed priority value based on priority related data (e.g., information 300-302) to determine that an MO data notification message should be sent onward to a notification receiver, e.g., AF 106. Continuing this example, after determining that an MO data notification message has a priority value that meets or exceeds a threshold value for delivery during a congestion condition or event, NF 200 or DM 204 may send the MO data notification message to or toward NEF 118.

Referring to FIG. 4, in step 401, NEF 118 may receive a configuration request message (e.g., a NIDD configuration request or other configuration request) comprising a context priority value or other information from AF 106. For example, AF 106 may provide a vendor specific extension (e.g., a data structure comprising a "version" attribute and a "context_priority" attribute) indicating a context priority value usable as an initial value or input into a formula or algorithm for computing an absolute priority value.

In some embodiments, AF 106 may use SLA information for its respective devices and/or services and may set priority related information (e.g., context priority values) accordingly.

In some embodiments, AF 106 may provide priority related information (e.g., context priority values) for individual NIDD configuration requests or grouped NIDD configuration requests. For example, when a context priority value is set for grouped messages, the context priority value applies to all MO data notification messages that are part of this group, e.g., MO data notification messages associated with different UEs.

In step 402, after receiving the configuration request message, NEF 118 may store the NIDD context information contained in the configuration request message in its context data store or another data store, e.g., in data storage 206. In some embodiments, e.g., after receiving a configuration request message for configuring or establishing an NIDD context, NEF 118 or DM 204 therein may compute a new priority value (e.g., an absolute priority value) for the NIDD context using a formula or algorithm (e.g., stored in data storage 206) for ensuring the new priority value is within an acceptable value range. For example, a priority value may be computed using a context priority value provided by AF 106 and using a minimum priority value and a maximum priority value provided by a network operator, NEF 118, or another entity. NEF 118, DM 204, or another entity may store the computed priority value for the relevant context in its context data store or another data store for future use.

In step 403, after the context information is stored, NEF 118 may send a configuration response message (e.g., a NIDD configuration response) to AF 106.

In step 404, e.g., after the configuration response message is sent, NEF 118 may receive a context creation request message (e.g., an SMContext_Create request) from SMF 108.

In step 405, after receiving the context creation request message, NEF 118 may validate the previously stored NIDD configuration related to AF 106. If the NIDD configuration information is valid, NEF 118 may accept and process the context creation request message.

In step 406, after validating the NIDD configuration information and processing the context creation request message, NEF 118 may send a context creation acknowledgment message (e.g., a '201 Created' response message) to SMF 108 to indicate the successful validation.

In step 407, SMF 108 may send to NEF 118 an MO delivery request message (e.g., a {resourceURI}/deliver request message) that contains MO data from user equipment (e.g., an IoT device) serviced by SMF 108.

In step 408, after receiving the MO delivery request message, NEF 118 may find or attempt to find NIDD context information in its local context data store and may use the NIDD context information and/or other information to identify AF 106 as a destination for an MO data notification message.

In some embodiments, e.g., if an overload or congestion condition exists, NEF 118 and/or DM 204 may implement a CA policy to mitigate or reduce congestion or overload related issues. In such embodiments, NEF 118 and/or DM 204 may use a computed priority value associated with an MO data notification message (e.g., based on a received MO delivery request) to determine how to handle the MO data notification message.

For example (e.g., where a lower priority value indicates a higher relative importance), NEF 118 and/or DM 204 may determine whether a computed priority value is equal to or less than a threshold value (e.g., based on a relevant CA policy) for indicating that the MO data notification message is to be delivered. In this example, if the computed priority value is sufficient for delivery (e.g., the computed priority value is equal to or less than the threshold value), NEF 118 and/or DM 204 may send the MO data notification message toward AF 106. Otherwise, if the computed priority value is insufficient for delivery (e.g., the computed priority value is greater than the threshold value), NEF 118 and/or DM 204 may discard the MO data notification message or delay delivery (e.g., until congestion or overload subsides).

In some embodiments, a network operator or another entity may provide default priority values for various types of messages (e.g., an MONTE message or a NIDD message) and/or for messages to various notification receivers (e.g., different AFs 106). In such embodiments, if an initial priority value (e.g., a context priority value) is unavailable or not provided, an appropriate default priority value for an MO data notification message may be determined and used as input (e.g., as the context or initial priority value) in an algorithm or formula when computing a new priority value (e.g., an absolute priority value). In some embodiments, if an initial priority value (e.g., a context priority value) is unavailable or not provided, an appropriate default priority value for an MO data notification message may be determined and used as an absolute priority value (e.g., without computing a new priority value).

In some embodiments, e.g., when an appropriate absolute priority value is not yet computed or when a new calculation is needed (e.g., when updated context priority related information has been received from AF 106 or when relevant CA rule information (e.g., a minimum priority value and/or a maximum priority value associated with a current NIDD delivery) has changed), NEF 118 and/or DM 204 may calculate or compute a new priority value (e.g., an absolute priority value). For example, for a particular message, a message flow, or an NIDD context, NEF 118 and/or DM 204 may identify relevant CA rule information (e.g., a minimum priority value and a maximum priority value and, optionally, a particular formula or algorithm) based on a notification receiver (e.g., an AF identifier) and/or a relevant service type (e.g., MONTE or NIDD). In this example, NEF 118 and/or DM 204 may use a relevant (e.g., context-based or operator-based) formula or algorithm that uses a minimum priority value, a maximum priority value, and an initial priority value (e.g., a context priority value previously provided by AF 106 in a NIDD configuration request).

In some embodiments, e.g., when an appropriate absolute priority value was previously computed and a new calculation is not needed, NEF 118 and/or DM 204 may obtain a previously computed priority value (e.g., an absolute priority value) from its context data store or another data store and then use the computed priority value for determining how to handle (e.g., deliver or discard) a corresponding MO data notification message.

In some embodiments, e.g., if an overload or congestion condition does not exist, NEF 118 and/or DM 204 may implement a different policy (e.g., a non-CA policy) or different rules for delivering MO data or related notifications. In such embodiments, the different policy or rule may or may not use a computed priority value when determining how to handle (e.g., deliver or discard) MO data notification messages.

In step 409, NEF 118 may send an MO data notification message (e.g., an MO data notification request) to AF 106.

In step 410, after receiving the MO data notification message, AF 106 may respond by directing an MO data notification response message to NEF 118.

In step 411, NEF 118 may send a no content acknowledgment message to SMF 108 indicating the successful delivery.

It will be appreciated that FIG. 4 is for illustrative purposes and that different and/or additional messages and/or actions may be used. It will also be appreciated that various messages and/or actions described herein related to scenario 400 may occur in a different order or sequence.

Figure 5:
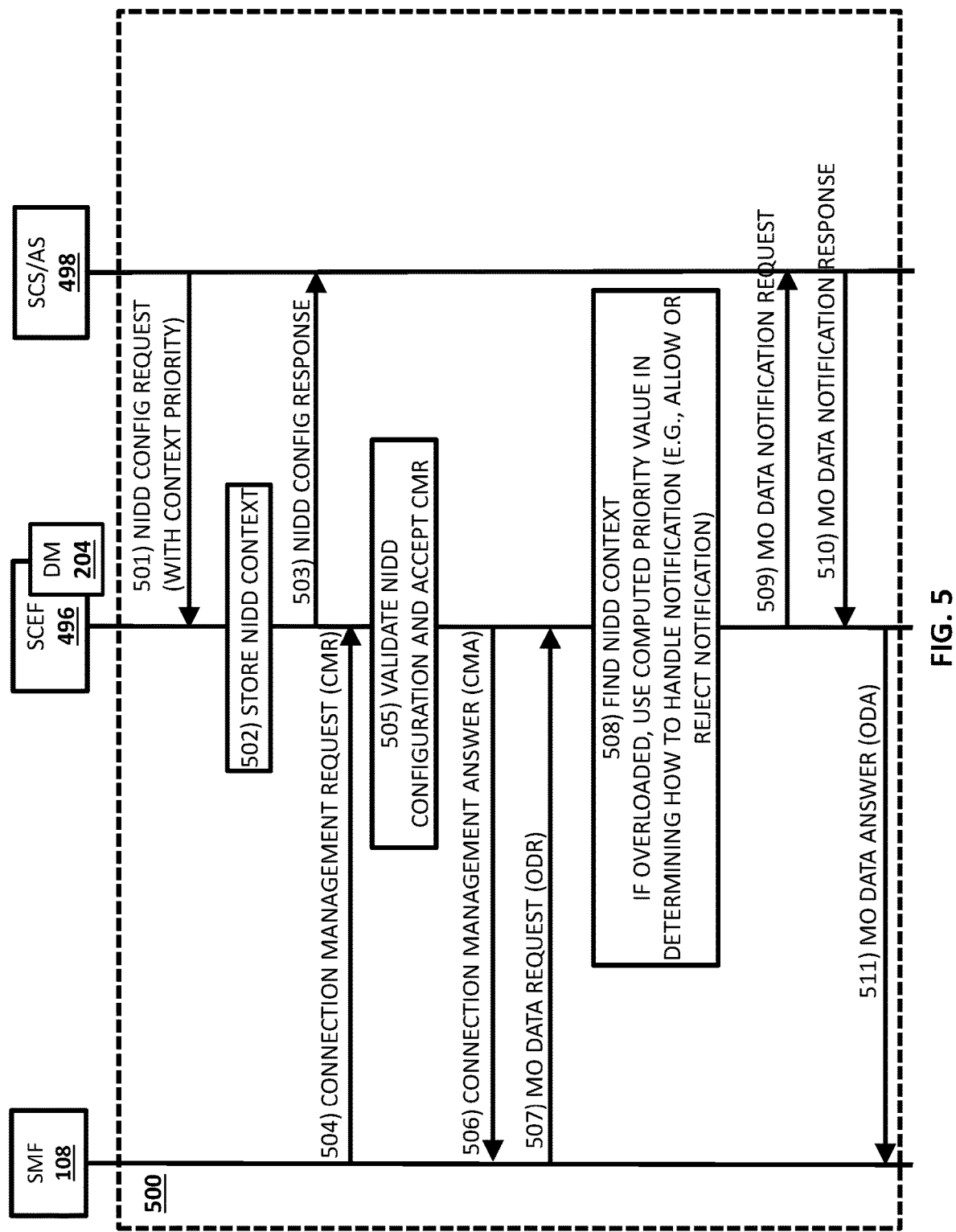
FIG. 5 is a message flow diagram illustrating an example scenario involving MO data delivery using a service capability exposure function (SCEF)

FIG. 5 is a message flow diagram illustrating an example scenario 500 involving MO data delivery using an SCEF 496. In some embodiments, SCEF 496 may include DM 204 and/or various functionality similar to or the same as NF 200. For example, SCEF 496 or DM 204 may be configured to control or manage messages associated with MO data delivery, e.g., by implementing or enforcing one or more CA policies. In this example, e.g., during an overload or congestion condition, SCEF 496 or DM 204 may use a computed priority value based on various priority related data (e.g., information 300-302) to determine that an MO data notification message should be sent onward to a notification receiver, e.g., an SCS and/or an AS (SCS/AS) 498. Continuing this example, after determining that an MO data notification message has a priority value that meets or exceeds a threshold value for delivery during a congestion condition or event, SCEF 496 or DM 204 may send the MO data notification message to or toward SCS/AS 498.

Referring to FIG. 5, in step 501, SCEF 496 may receive a configuration request message (e.g., a NIDD configuration request) comprising a context priority value or other information from SCS/AS 498. For example, SCS/AS 498 may provide a vendor specific extension (e.g., a data structure comprising a "version" attribute and a "context_priority" attribute) indicating a context priority value usable as an initial value or input into a formula or algorithm for computing an absolute priority value.

In some embodiments, SCS/AS 498 may use SLA information for its respective devices and/or services and may set priority related information (e.g., context priority values) accordingly.

In some embodiments, SCS/AS 498 may provide priority related information (e.g., context priority values) for individual NIDD configuration requests or grouped NIDD configuration requests. For example, when a context priority value is set for grouped messages, the context priority value applies to all MO data notification messages that are part of this group, e.g., MO data notification messages associated with different UEs.

In step 502, after receiving the configuration request message, SCEF 496 may store the NIDD context information contained in the configuration request message in its context data store or another data store, e.g., in data storage 206.

In some embodiments, e.g., after receiving a configuration request message for configuring or establishing an NIDD context, SCEF 496 or DM 204 therein may compute a new priority value (e.g., an absolute priority value) for the NIDD context using a formula or algorithm (e.g., stored in data storage 206) for ensuring the new priority value is within an acceptable value range. For example, a priority value may be computed using a context priority value provided by SCS/AS 498 and using a minimum priority value and a maximum priority value provided by a network operator, SCEF 496, or another entity. SCEF 496, DM 204, or another entity may store the computed priority value for the relevant context in its context data store or another data store for future use.

In step 503, after the context information is stored, SCEF 496 may send a configuration response message (e.g., a NIDD configuration response) to SCS/AS 498.

In step 504, e.g., after the configuration response message is sent, SCEF 496 may receive a context creation request message (e.g., a connection management request (CMR)) from SMF 108.

In step 505, after receiving the context creation request message, SCEF 496 may validate the previously stored NIDD configuration related to SCS/AS 498. If the NIDD configuration information is valid, SCEF 496 may accept and process the context creation request message.

In step 506, after validating the NIDD configuration information and processing the context creation request message, SCEF 496 may send a context creation acknowledgment message (e.g., a connection management answer (CMA)) to SMF 108 to indicate the successful validation.

In step 507, SMF 108 may send to SCEF 496 an MO delivery request message (e.g., an MO data request (ODR)) that contains MO data from user equipment (e.g., an IoT device) serviced by SMF 108.

In step 508, after receiving the MO delivery request message, SCEF 496 may find or attempt to find NIDD context information in its local context data store and may use the NIDD context information and/or other information to identify SCS/AS 498 as a destination for an MO data notification message for providing the MO data.

In some embodiments, e.g., if an overload or congestion condition exists, SCEF 496 and/or DM 204 may implement a CA policy to mitigate or reduce congestion or overload related issues. In such embodiments, SCEF 496 and/or DM 204 may use a computed priority value associated with an MO data notification message (e.g., based on a received MO delivery request) to determine how to handle the MO data notification message.

For example (e.g., where a lower priority value indicates a higher relative importance), SCEF 496 and/or DM 204 may determine whether a computed priority value is equal to or lesser than a threshold value (e.g., based on a relevant CA policy) for indicating that the MO data notification message is to be delivered. In this example, if the computed priority value is sufficient for delivery (e.g., the computed priority value is equal to or less than the threshold value), SCEF 496 and/or DM 204 may send the MO data notification message toward SCS/AS 498. Otherwise, if the computed priority value is insufficient for delivery (e.g., the computed priority value is greater than the threshold value), SCEF 496 and/or DM 204 may discard the MO data notification message or delay delivery (e.g., until congestion or overload subsides).

In some embodiments, a network operator or another entity may provide default priority values for various types of messages (e.g., an MONTE message or a NIDD message) and/or for messages to various notification receivers (e.g., different SCS/AS 498). In such embodiments, if an initial priority value (e.g., a context priority value) is unavailable or not provided, an appropriate default priority value for an MO data notification message may be determined and used as input (e.g., as the context or initial priority value) in an algorithm or formula when computing a new priority value (e.g., an absolute priority value). In some embodiments, if an initial priority value (e.g., a context priority value) is unavailable or not provided, an appropriate default priority value for an MO data notification message may be determined and used as an absolute priority value (e.g., without computing a new priority value).

In some embodiments, e.g., when an appropriate absolute priority value is not yet computed or when a new calculation is needed (e.g., when updated context priority related information has been received from SCS/AS 498 or when relevant CA rule information (e.g., a minimum priority value and/or a maximum priority value associated with a current NIDD delivery) has changed), SCEF 496 and/or DM 204 may calculate or compute a new priority value (e.g., an absolute priority value). For example, for a particular message, a message flow, or an NIDD context, SCEF 496 and/or DM 204 may identify relevant CA rule information (e.g., a minimum priority value and a maximum priority value and, optionally, a particular formula or algorithm) based on a notification receiver (e.g., an AF identifier) and/or a relevant service type (e.g., MONTE or NIDD). In this example, SCEF 496 and/or DM 204 may use a relevant (e.g., context-based or operator-based) formula or algorithm that uses a minimum priority value, a maximum priority value, and an initial priority value (e.g., a context priority value previously provided by SCS/AS 498 in a NIDD configuration request).

In some embodiments, e.g., when an appropriate absolute priority value was previously computed and a new calculation is not needed, SCEF 496 and/or DM 204 may obtain a previously computed priority value (e.g., an absolute priority value) from its context data store or another data store and then use the computed priority value for determining how to handle (e.g., deliver or discard) a corresponding MO data notification message.

In some embodiments, e.g., if an overload or congestion condition does not exist, SCEF 496 and/or DM 204 may implement a different policy (e.g., a non-CA policy) or different rules for delivering MO data or related notifications. In such embodiments, the different policy or rule may or may not use a computed priority value when determining how to handle (e.g., deliver or discard) MO data notification messages.

In step 509, SCEF 496 may send an MO data notification message (e.g., an MO data notification request) to SCS/AS 498.

In step 510, after receiving the MO data notification message, SCS/AS 498 may respond by directing an MO data notification response message to SCEF 496.

In step 511, SCEF 496 may send MO delivery response message (e.g., an MO data answer (ODA)) to SMF 108 indicating the successful delivery.

It will be appreciated that FIG. 5 is for illustrative purposes and that different and/or additional messages and/or actions may be used. It will also be appreciated that various messages and/or actions described herein related to scenario 500 may occur in a different order or sequence.

Figure 6:
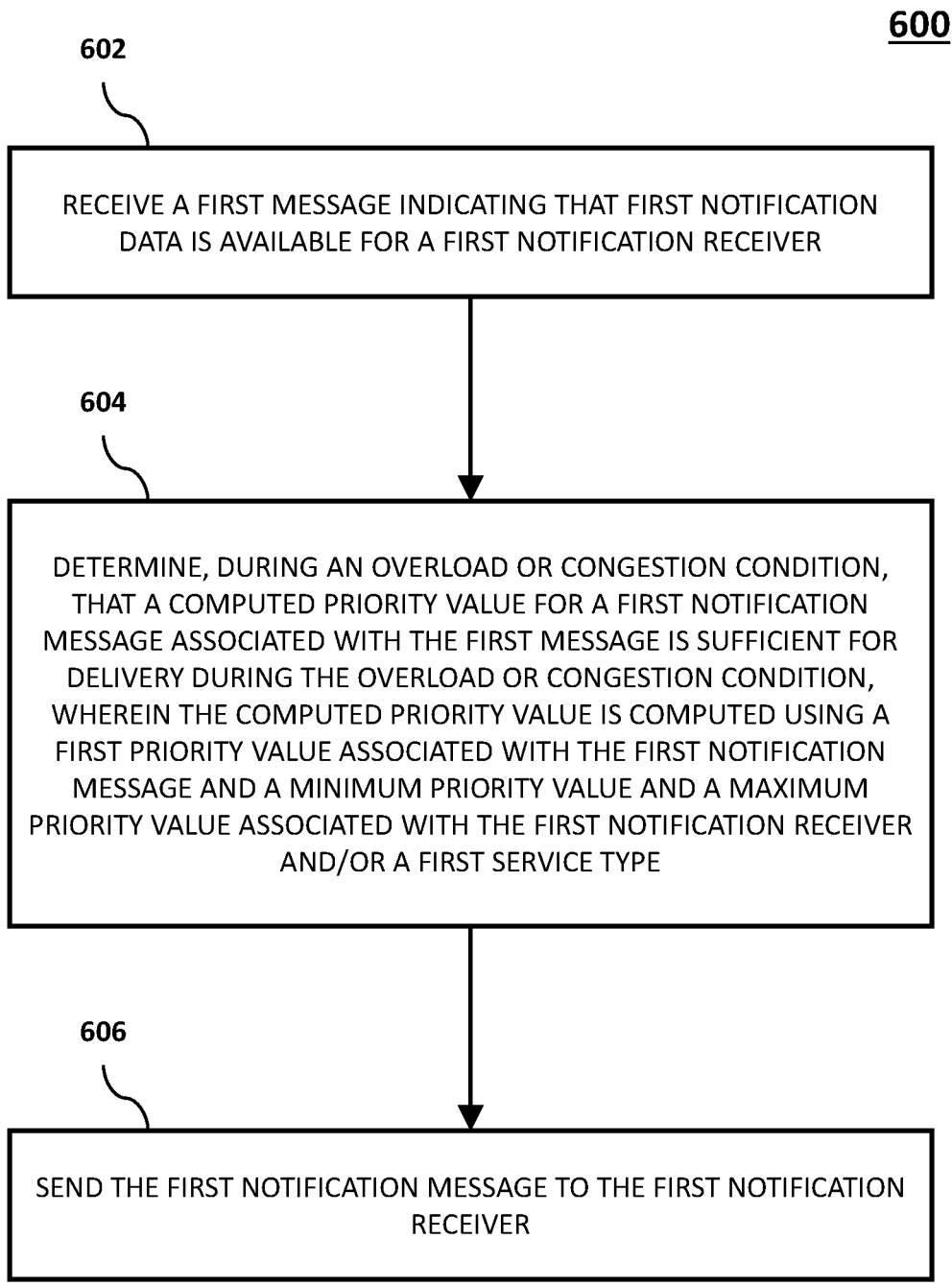
FIG. 6 is a flow chart illustrating an example process for notification delivery.

FIG. 6 is a diagram illustrating an example process 600 for notification delivery. In some embodiments, example process 600 described herein, or portions (e.g., operations or steps) thereof, may be performed at or performed by NF 200, DM 204, and/or a module or node.

Referring to process 600, in step 602, a first message indicating that first notification data is available for a first notification receiver may be received. In some embodiments, a first message indicating that notification data is available for a notification receiver may include a monitoring report message, an ODR or an NIDD delivery notify message (e.g., a Nnef_NIDD_DeliveryNotify request).

In step 604, it may be determined, during an overload or congestion condition (e.g., as determined based on observed network conditions, metrics, or other information), that a computed priority value for a first notification message (e.g., an MO or monitoring data notification message) associated with the first message is sufficient for delivery during the overload or congestion condition, wherein the computed priority value is computed using a first priority value associated with the first notification message and a minimum priority value and a maximum priority value associated with the first notification receiver and/or a first service type. For example, NF 200 or DM 204 may use a CA policy that indicates one or more threshold values, e.g., threshold values may be based on service types, notification receiver, congestion levels, and/or other factors. In this example, for a particular congestion level (e.g., level '1'), if a computed priority value for a notification message is equal to or less than a corresponding threshold value then NF 200 or DM 204 may deem the computed priority value is sufficient for delivering or sending the message onward toward a relevant notification receiver. However, continuing with this example, if the computed priority value for the notification message is greater than the corresponding threshold value then NF 200 or DM 204 may discard the notification message or wait to deliver the notification message (e.g., until the congestion condition subsides).

In step 606, the first notification message may be sent to the first notification receiver. For example, after determining that a notification message has a priority value that meets or exceeds a threshold value for delivery during a congestion condition or event, NF 200 or DM 204 may send the notification message to or toward SCS/AS 498 or AF 106.

In some embodiments, a first notification message may include an MO data notification message or a MONTE notification message.

In some embodiments, a computed priority value (e.g., an absolute priority value) may be computed using a formula or algorithm that ensures that the computed priority value is between the minimum priority value and the maximum priority value. For example, a formula or algorithm may divide an initial or first priority value (e.g., a context priority value or a relative priority value provided by SCS/AS 498 or AF 106) by the maximum priority value allowed for initial or first priority values (e.g., '255', based on a 1-byte data size for a related "context_priority" attribute), the quotient (the result of the above division) may then be multiplied by the difference between a maximum priority value (e.g., provided by a network operator or other entity) and a minimum priority value (e.g., provided by a network operator or other entity) to yield a product. In this example, the minimum priority value may then be added to the product to yield the computed priority value (e.g., an absolute priority value). Continuing with this example, NF 200, DM 204, or another entity may store the computed priority value for the relevant context in data storage 206 and/or other data storage for future use.

In some embodiments, a computed priority value (e.g., an absolute priority value) may be computed prior to receiving a first message. For example, NF 200 may receive a NIDD configuration request from SCS/AS 498 or AF 106, where the NIDD configuration request may include one or more attributes (e.g., vendor specific attributes, such as an attribute named "context_priority") indicating a context or relative priority value. In this example, after receiving the context priority value (e.g., during the NIDD context configuration procedure), NF 200 may compute an absolute priority value for MO data notification messages associated with this NIDD context using the context priority value and a formula or algorithm that ensures the computed priority value does not exceed some particular boundaries, e.g., inclusively between a minimum priority value and a maximum priority value, where the minimum priority value or the maximum priority value is also an acceptable value.

In some embodiments, a computed priority value may be computed concurrently with or after receiving the first message. For example, NF 200 may receive an ODR or an NIDD delivery notify message indicating that new MO data is available and, in response to or after receiving the ODR or the NIDD delivery notify message, NF 200 may compute a new priority message (e.g., an absolute priority value). In some embodiments, NF 200 may compute a new priority message only when a overload or congestion condition exists.

In some embodiments, a first priority value (e.g., an initial priority value used in computing a computed priority value) may include a context priority value based on a NIDD context.

In some embodiments, a first priority value (e.g., an initial priority value used in computing a priority value) may be provided by a notification receiver. For example, SCS/AS 498 or AF 106 may provide a context priority value in a NIDD configuration request, e.g., stored in a vendor specific extension or attribute. In some embodiments, a first priority value (e.g., an initial priority value used in computing a priority value) may be provided by a network operator (e.g., a user or system that provisions or specifies network related settings). For example, a network operator or another entity may provide default priority values for various types of messages (e.g., T8 service messages) and/or for messages to various notification receivers (e.g., different SCS/AS 498). In this example, a default priority value may be used as a priority value for an MO data notification, e.g., if a context priority value or another priority value is not provided by a notification receiver (e.g., during a NIDD context configuration).

In some embodiments, a default priority value may be used as input (e.g., a context priority value or a first priority value) in an algorithm or formula when computing a new priority value (e.g., an absolute priority value). In some embodiments, if a default priority value is used, the default priority value may be treated as an absolute priority value (e.g., without computing a new priority value).

In some embodiments, a service type (e.g., associated with an MO data notification message) may include or indicate a T8 interface based service, an N33 interface based service, an NIDD service, or an MONTE service.

In some embodiments, NF 200, DM 204, or another entity (e.g., a network node or a computing platform) may be configured for receiving a second message indicating that second notification data is available for a second notification receiver; determining, during an overload or congestion condition, that a second notification message associated with the second message lacks a corresponding context priority value; determining, using a service type and/or the second notification receiver, a default priority value for the second notification message; determining whether the default priority value for the second notification message is sufficient for delivery during the overload or congestion condition; in response to determining that the default priority value for the second notification message is sufficient for delivery during the overload or congestion condition, sending the second notification message to the second notification receiver; and in response to determining that the default priority value for the second notification message is insufficient for delivery during the overload or congestion condition, discarding the second notification message or queuing the second notification message for later delivery to the second notification receiver.

In some embodiments, a notification receiver may include AF 106 or SCS/AS 498.

In some embodiments, NF 200 may include SCEF 496 or NEF 118.

It will be appreciated that process 600 is for illustrative purposes and that different and/or additional messages may be communicated and/or actions may be performed. It will also be appreciated that various messages and/or actions described herein may occur in a different order or sequence.

It will be appreciated that while some aspects of the subject matter described herein has been discussed with reference to 5G networks various other networks (e.g., 4G networks) may utilize some aspects of the subject matter described herein. For example, any network that allows or utilizes NEF, SCEF, or similar functions may use features, systems, mechanisms, and/or techniques described herein to perform MO data delivery, implement CA policies, compute priority values, or various other actions.

It should be noted that NF 200, DM 204, and/or functionality described herein may constitute a special purpose computing device. Further, NF 200, DM 204, and/or functionality described herein can improve the technological field of network communications and/or congestion avoidance. For example, NF 200 may include DM 204 and may be capable of determining, using computed priority values, whether messages (e.g., MO data notification messages or MONTE notification messages) should be delivered, e.g., during a congestion or overload condition. In this example, NF 200 or DM 204 may compute a priority value for a notification message using a context priority value provided by a related notification receiver (e.g., SCS/AS 498 or AF 106). Continuing with this example, since notification receivers can provide context priority values and since context priority values can be used to generate absolute or final priority values usable to determine whether messages are delivered (or discarded), notification receivers can affect the probability of notification rejections or successes for different NIDD contexts.

The disclosure of each of the following references is incorporated herein by reference in its entirety to the extent not inconsistent herewith and to the extent that it supplements, explains, provides a background for, or teaches methods, techniques, and/or systems employed herein.

REFERENCES 1. 3GPP TS 29.500; 3rd Generation Partnership Project; Technical Specification Group Core Network and Terminals; 5G System; Technical Realization of 30 Service Based Architecture; Stage 3 (Release 16); V16.9.0 (2021-09).
2. 3GPP TS 23.682; 3rd Generation Partnership Project; Technical Specification Group Services and System Aspects; Architecture enhancements to facilitate communications with packet data networks and applications; (Release 16); V16.10.0 (2021-09).
3. 3GPP TS 29.522; 3rd Generation Partnership Project; Technical Specification Group Core Network and Terminals; 5G System; Network Exposure Function Northbound APIs; Stage 3 (Release 16); V16.9.0 (2021-09).
4. 3GPP TS 29.122; 3rd Generation Partnership Project; Technical Specification Group Core Network and Terminals; T8 reference point for Northbound APIs; (Release 16); V16.11.0 (2021-09).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for notification delivery, the method comprising:
    at a network function including at least one processor:
        receiving a first message indicating that first notification data is available for a first notification receiver;
        detecting, by the network function, an overload condition of the network function or the first notification receiver or a network congestion condition experienced by the network function or the first notification receiver, caused by a burst of network traffic received by the network function or the first notification receiver;
        determining, during the overload condition of the network function or the first notification receiver or the network congestion condition experienced by the network function or the first notification receiver, that a computed priority value for a first notification message associated with the first message is sufficient for delivery during the overload condition of the network function or the first notification receiver or the network congestion condition experienced by the network function or the first notification receiver, wherein the computed priority value is computed using a first priority value associated with the first notification message and a minimum priority value and a maximum priority value associated with the first notification receiver and/or a first service type; and
        sending the first notification message to the first notification receiver.

2. The method of claim 1 wherein the computed priority value is computed using a formula or algorithm that ensures that the computed priority value is between the minimum priority value and the maximum priority value.

3. The method of claim 1 wherein the computed priority value is computed prior to receiving the first message; or wherein the computed priority value is computed concurrently with or after receiving the first message.

4. The method of claim 1 wherein the first priority value includes a context priority value associated with a non-IP data delivery (NIDD) context; wherein the first priority value is provided by a network operator; or wherein the first priority value is provided by the first notification receiver.

5. The method of claim 1 wherein the first service type includes or indicates a T8 interface based service, an N33 interface based service, a non-IP data delivery (NIDD) service, or an monitoring events (MONTE) service.

6. The method of claim 1 comprising:
    receiving a second message indicating that second notification data is available for a second notification receiver;
    detecting, by the network function, an overload condition of the second notification receiver or a network congestion condition experienced by the second notification receiver, caused by a burst of network traffic received by the second notification receiver;

determining, during the overload condition of the network function or the second notification receiver or the network congestion condition experienced by the network function or the second notification receiver, that a second notification message associated with the second message lacks a corresponding context priority value;

determining, using a service type and/or the second notification receiver, a default priority value for the second notification message;

determining whether the default priority value for the second notification message is sufficient for delivery during the overload condition of the network function or the second notification receiver or the network congestion condition experienced by the network function or the second notification receiver;

in response to determining that the default priority value for the second notification message is sufficient for delivery during the overload condition of the network function or the second notification receiver or the network congestion condition experienced by the network function or the second notification receiver, sending the second notification message to the second notification receiver; and in response to determining that the default priority value for the second notification message is insufficient for delivery during the overload condition of the network function or the second notification receiver or the network congestion condition experienced by the network function or the second notification receiver, discarding the second notification message or queuing the second notification message for later delivery to the second notification receiver.

7. The method of claim 1 wherein the first message includes a monitoring report message, an mobile originated (MO) data request (ODR), or a non-IP data delivery (NIDD) delivery notify message; or wherein the first notification message includes an MO data notification message or a monitoring events (MONTE) notification message.

8. The method of claim 1 wherein the first notification receiver includes an application function (AF), a service capability server (SCS), or an application server (AS).

9. The method of claim 1 wherein the network function includes a network exposure function (NEF) or a service capability exposure function (SCEF).

10. A system for notification delivery, the system comprising:
at least one processor;
a memory; and
a network function including the at least one processor and the memory, the network function configured for:
receiving a first message indicating that first notification data is available for a first notification receiver;
detecting an overload condition of the network function or the first notification receiver or a network congestion condition experienced by the network function or the first notification receiver, caused by a burst of network traffic received by the network function or the first notification receiver;
determining, during the overload condition of the network function or the first notification receiver or the network congestion condition experienced by the network function or the first notification receiver, that a computed priority value for a first notification message associated with the first message indicates an acceptable priority value for delivery during the overload condition of the network function or the first notification receiver or the network congestion condition experienced by the network function or the first notification receiver, wherein the computed priority value is computed using a first priority value associated with the first notification message and a minimum priority value and a maximum priority value associated with the first notification receiver and/or a first service type; and
sending the first notification message to the first notification receiver.

11. The system of claim 10 wherein the network function computes the computed priority value using a formula or algorithm that ensures that the computed priority value is between the minimum priority value and the maximum priority value.

12. The system of claim 10 wherein the network function computes the computed priority value prior to receiving the first message; or wherein the network function computes the computed priority value concurrently with or after receiving the first message.

13. The system of claim 10 wherein the first priority value includes a context priority value associated with a non-IP data delivery (NIDD) context; wherein the first priority value is provided by a network operator; or wherein the first priority value is provided by the first notification receiver.

14. The system of claim 13 wherein the context priority value is provided in a custom header portion or a vendor specific attribute of a configuration message from the first notification receiver.

15. The system of claim 10 wherein the first service type includes or indicates a T8 interface based service, an N33 interface based service, a non-IP data delivery (NIDD) service, or an monitoring events (MONTE) service.

16. The system of claim 10 wherein the network function is configured for:
receiving a second message indicating that second notification data is available for a second notification receiver;
detecting, by the network function, an overload condition of the second notification receiver or a network congestion condition experienced by the second notification receiver, caused by a burst of network traffic received by the second notification receiver;
determining, during the overload condition of the network function or the second notification receiver or the network congestion condition experienced by the network function or the second notification receiver, that a second notification message associated with the second message lacks a corresponding context priority value;
determining, using a second service type and/or the second notification receiver, a default priority value for the second notification message;
determining whether the default priority value for the second notification message is sufficient for delivery during the overload condition of the network function or the second notification receiver or the network congestion condition experienced by the network function or the second notification receiver;
in response to determining that the default priority value for the second notification message is sufficient for delivery during the overload condition of the network function or the second notification receiver or the network congestion condition experienced by the network function or the second notification receiver, sending the second notification message to the second notification receiver; and in response to determining that the default priority value for the second notification message is insufficient for delivery during the overload condition of the network function or the second notification receiver or the network congestion condition experienced by the network function or the second notification receiver, discarding the second notification message or queuing the second notification message for later delivery to the second notification receiver.

17. The system of claim 10 wherein the first message includes a monitoring report message, an mobile originated (MO) data request (ODR) or a non-IP data delivery (NIDD) delivery notify message; or wherein the first notification message includes an MO data notification message or a monitoring events (MONTE) notification message.

18. The system of claim 10 wherein the first notification receiver includes an application function (AF), a service capability server (SCS), or an application server (AS).

19. The system of claim 10 wherein the network function includes a network exposure function (NEF) or a service capability exposure function (SCEF).

20. A non-transitory computer readable medium having stored thereon executable instructions that when executed by at least one processor of a computer cause the computer to perform steps comprising:

at a network function including at least one processor:
receiving a first message indicating that first notification data is available for a first notification receiver;
detecting, by the network function, an overload condition of the network function or the first notification receiver or a network congestion condition experienced by the network function or the first notification receiver, caused by a burst of network traffic received by the network function or the first notification receiver;
determining, during the overload condition of the network function or the first notification receiver or the network congestion condition experienced by the network function or the first notification receiver, that a computed priority value for a first notification message associated with the first message indicates an acceptable priority value for delivery during the overload condition of the network function or the first notification receiver or the network congestion condition experienced by the network function or the first notification receiver, wherein the computed priority value is computed using a first priority value associated with the first notification message and a minimum priority value and a maximum priority value associated with the first notification receiver and/or a first service type; and
sending the first notification message to the first notification receiver.

\* \* \* \* \*